United States Patent
Takeda et al.

(10) Patent No.: US 11,456,841 B2
(45) Date of Patent: Sep. 27, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/633,748

(22) PCT Filed: Jul. 27, 2017

(86) PCT No.: PCT/JP2017/027333
§ 371 (c)(1),
(2) Date: Jan. 24, 2020

(87) PCT Pub. No.: WO2019/021443
PCT Pub. Date: Jan. 31, 2019

(65) Prior Publication Data
US 2020/0213065 A1    Jul. 2, 2020

(51) Int. Cl.
*H04W 72/04* (2009.01)
*H04L 5/00* (2006.01)

(52) U.S. Cl.
CPC .......... *H04L 5/0092* (2013.01); *H04L 5/0082* (2013.01); *H04W 72/042* (2013.01)

(58) Field of Classification Search
CPC ... H04L 5/0082; H04L 5/0092; H04W 72/042
See application file for complete search history.

(56) References Cited

U.S. PATENT DOCUMENTS

| | | | | |
|---|---|---|---|---|
| 2017/0134880 | A1* | 5/2017 | Rico Alvarino | H04L 5/0007 |
| 2017/0273113 | A1* | 9/2017 | Tirronen | H04W 72/042 |
| 2018/0048448 | A1* | 2/2018 | Zhang | H04L 5/0053 |
| 2018/0183551 | A1* | 6/2018 | Chou | H04L 5/0098 |
| 2018/0192354 | A1* | 7/2018 | Yi | H04L 5/0094 |
| 2018/0309489 | A1* | 10/2018 | Hosseini | H04L 5/0053 |
| 2019/0020506 | A1* | 1/2019 | Cheng | H04L 5/0094 |
| 2019/0141679 | A1* | 5/2019 | He | H04L 5/0007 |

(Continued)

OTHER PUBLICATIONS

Extended European Search Report issued in counterpart European Patent Application No. 17919299.2, dated Dec. 16, 2020 (10 pages).

(Continued)

*Primary Examiner* — Chi Ho A Lee
(74) *Attorney, Agent, or Firm* — Osha Bergman Watanabe & Burton LLP

(57) ABSTRACT

A terminal is disclosed including a receiver that receives configuration information for a downlink bandwidth part (DL BWP), the configuration information including a control resource set (CORESET) configuration and a search space configuration; and a processor that determines a CORESET related to a DL BWP based on the configuration information for the DL BWP, wherein, upon detection of a downlink control information in the CORESET, the receiver receives a physical downlink shared channel (PDSCH) in the DL BWP, based on the configuration information for the DL BWP. In other aspects, a radio communication method for a terminal is also disclosed.

4 Claims, 9 Drawing Sheets

(56) References Cited

U.S. PATENT DOCUMENTS

| | | | | |
|---|---|---|---|---|
| 2019/0356524 A1* | 11/2019 | Yi | ......................... | H04W 48/16 |
| 2020/0067676 A1* | 2/2020 | Yi | ......................... | H04L 1/0013 |
| 2020/0077432 A1* | 3/2020 | Xiong | ................... | H04L 1/1812 |
| 2020/0288482 A1* | 9/2020 | Yi | ...................... | H04W 72/1289 |
| 2020/0344761 A1* | 10/2020 | Amuru | ................... | H04L 5/001 |

OTHER PUBLICATIONS

Huawei, HiSilicon; "Scheduling and resource allocation mechanism for active bandwidth parts"; 3GPP TSG RAN WG1 NR Ad Hoc Meeting, R1-1709974; Qingdao, China; Jun. 27-30, 2017 (7 pages).
3GPP TR 38.802 V14.1.0; "3rd Generation Partnership Project; Technical Specification Group Radio Access Network; Study on New Radio Access Technology Physical Layer Aspects (Release 14)" Jun. 2017 (143 pages).
Apple Inc.; "Group-common PDCCH for NR"; 3GPP TSG-RAN WG1 #89, R1-1708280; Hangzhou, China; May 15-19, 2017 (4 pages).
InterDigital Inc.; "CORESET Monitoring Under Dynamic Change of BWP"; 3GPP TSG RAN WG1 NR Ad-Hoc #2, R1-1710872; Qingdao, China; Jun. 27-30, 2017 (5 pages).
Huawei, HiSilicon; "Search space design"; 3GPP TSG RAN WG1 NR Ad Hoc Meeting, R1-1709952; Qingdao, China; Jun. 27-30, 2017 (6 pages).
International Search Report issued in PCT/JP2017/027333 dated Oct. 17, 2017 (1 page).
Written Opinion of the International Searching Authority issued in PCT/JP2017/027333 dated Oct. 17, 2017 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in the counterpart Korean Patent Application No. 10-2020-7003866, dated Jul. 8, 2021 (8 pages).
MCC Support; "Draft Report of 3GPP TSG RAN WG1 #AH_NR2 v0.1.0 (Qingdao, China, Jun. 27-30, 2017)"; 3GPP TSG RAN WG1 Meeting #90, R1-171xxxx; Prague, Czech Rep; Aug. 21-25, 2017 (105 pages).
Office Action issued in counterpart European Application No. 17919299.2 dated Sep. 22, 2021 (7 pages).
3GPP TSG RAN WG1 NR Ad-Hoc#2; R1-1711754 "WF on NR PDCCH Blind decodes" Vivo, Samsung; Qingdao, P.R. China; Jun. 27-30, 2017 (2 pages).
3GPP TSG-RAN WG1 #89; R1-1709736 "Way Forward on bandwidth part for efficient wideband operation in NR" MediaTek, Huawei, HiSilicon; Hangzhou, China; May 15-19, 2017 (3 pages).
3GPP TSG RAN WG1 Meeting #89; R1-1707828 "Efficient Wider Bandwidth Operations for NR" MediaTek Inc.; Hangzhou, China; May 15-19, 2017 (8 pages).
Office Action issued in African Regional IPO Application No. AP/P/2020/012223; dated Feb. 23, 2022 (5 pages).
Office Action issued in Korean Application No. 10-2020-7003866; dated Feb. 23, 2022 (8 pages).
Office Action issued in Indian Application No. 202037004054; dated Mar. 7, 2022 (6 pages).
Office Action issued in European Application No. 17919299.2; dated Mar. 11, 2022 (5 pages).

* cited by examiner

USER TERMINAL AND RADIO COMMUNICATION METHOD

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and low latency, Long Term Evolution (LTE) has been specified (Non-Patent Literature 1). Furthermore, for a larger volume and higher integration of LTE (LTE Rel. 8 and 9), LTE-Advanced (LTE-A that is LTE Rel. 10, 11, 12 and 13) has been specified.

LTE successor systems (referred to as, for example, Future Radio Access (FRA), the 5th generation mobile communication system (5G), 5G+ (plus), New Radio (NR), New radio access (NX), Future generation radio access (FX) and LTE Rel. 14, 15 or subsequent releases) have been also studied.

Legacy LTE systems (e.g., LTE Rel. 8 to 13) use a subframe (also referred to as a Transmission Time Interval (TTI)) of one ms to perform communication on DownLink (DL) and/or UpLink (UL). The subframe is a transmission time unit of one channel-coded data packet, and is a processing unit of scheduling, link adaptation and retransmission control (HARQ: Hybrid Automatic Repeat reQuest).

Furthermore, a radio base station (e.g., eNB (eNode B)) controls allocation (scheduling) of data to a user terminal (UE: User Equipment), and notifies the UE of a scheduling instruction of the data by using Downlink Control Information (DCI).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

It has been studied for a future radio communication system (e.g., NR) to notify a UE of DCI by using a COntrol REsource SET (CORESET) that is a control channel allocation candidate domain.

Furthermore, it has been studied for NR to configure to the UE one or a plurality of BandWidth Parts (BWP) included in a Component Carrier (CC).

Thus, it has been studied for NR to perform control based on the CORESET and the BWP. However, study regarding how to specifically configure these CORESET and BWP to the UE has not yet progressed. If an appropriate configuration method is not used, there is a risk that flexible control cannot be performed, and a communication throughput and frequency use efficiency deteriorate.

It is therefore one of objects of the present invention to provide a user terminal and a radio communication method that can prevent a communication throughput from lowering even when performing control based on a BWP.

Solution to Problem

A user terminal according to one aspect of the present invention includes: a control section that decides a relationship between a certain control resource set and a certain BandWidth Part (BWP); and a transmission/reception section that, when detecting downlink control information in the certain control resource set, performs transmission and/or reception in the certain BWP based on the relationship.

Advantageous Effects of Invention

According to the present invention, it is possible to appropriately prevent a communication throughput from lowering even when performing control based on a BWP.

DESCRIPTION OF EMBODIMENTS

Figure 1:
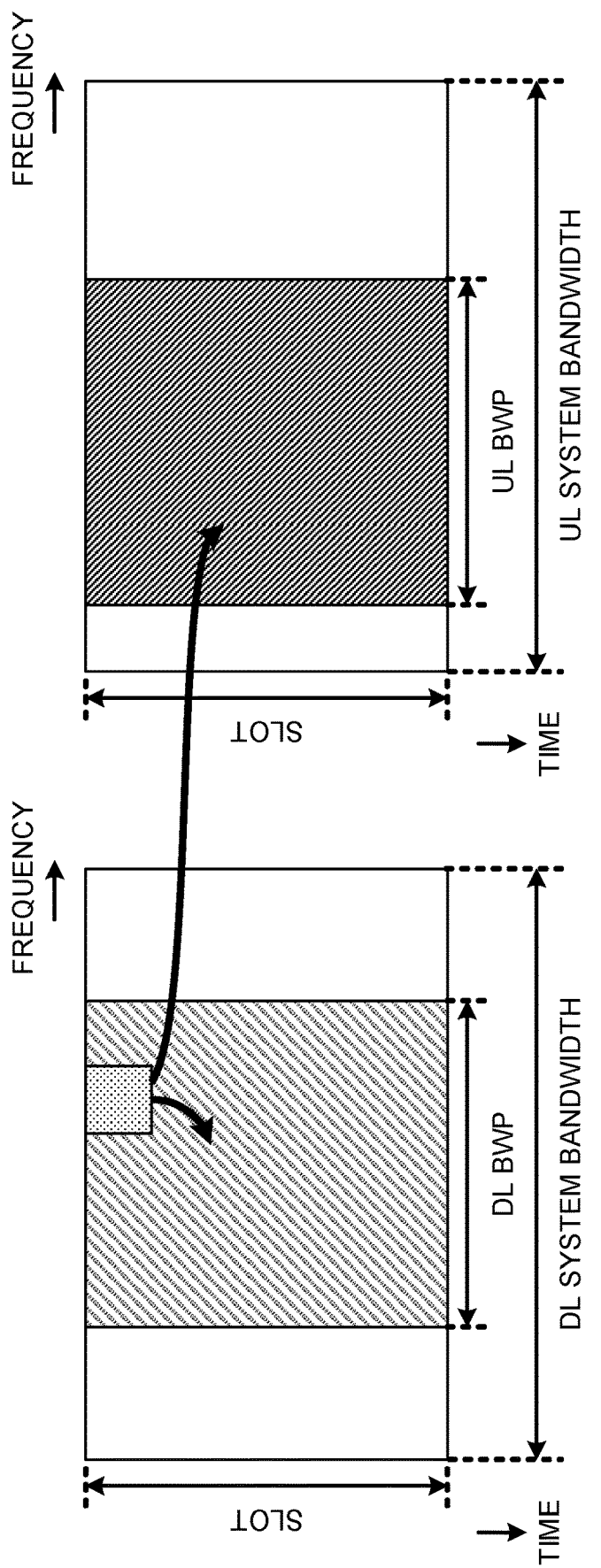
FIG. 1 is a diagram illustrating one example of a relationship between a CORESET and DL/UL BWPs according to a first embodiment.

It has been studied for future radio communication systems to allocate a Component Carrier (CC) of an ultrawideband (e.g., 200 MHz) to a UE. There is a risk that, when the UE to which the ultrawideband CC has been configured uses an entire system band at all times, power consumption of the UE becomes enormous. Hence, it has been studied for NR to semi-statically configure to the UE one or a plurality of BandWidth Parts (BWP) per CC.

The BWP used for DL communication may be referred to as a DL BWP, and the BWP used for UL communication may be referred to as a UL BWP. The UE may assume that at least one DL BWP and one UL BWP among configured BWPs are active (available) during a certain time. Furthermore, frequency bands of the DL BWP and the UL BWP may overlap each other.

The BWP is assumed to be associated with specific numerologies (a subcarrier spacing and a cyclic prefix length). The UE performs reception by using numerologies associated with the DL BWP among active DL BWPs, and performs transmission by using numerologies associated with the UL BWP among active UL BWPs.

The BWP configuration may include information of, for example, numerologies, a frequency position (e.g., center frequency), a bandwidth (e.g., the number of Resource Blocks (RBs that are also referred to as Physical RBs (PRB)), and a time resource (e.g., a slot (mini slot) index or a periodicity).

The BWP configuration may be notified by, for example, higher layer signaling (e.g., Radio Resource Control (RRC) signaling, broadcast information (a Master Information Block (MIB) or a System Information Block (SIB)) or Medium Access Control (MAC) signaling).

At least one (e.g., the DL BWP included in a primary CC) of the configured DL BWPs may include a COntrol REsource SET (CORESET) of a common search space. The CORESET is a control channel (e.g., a Physical Downlink Control Channel (PDCCH)) allocation candidate domain, and may be referred to as a control subband, a search space set, a search space resource set, a control domain, a control subband or an NR-PDCCH domain.

Furthermore, each configured DL BWP may include the CORESET of a UE-specific search space.

The UE may receive CORESET configuration information (that may be referred to as a CORESET configuration) from a gNB. The UE can detect a physical layer control signal by monitoring the CORESET configured to the own terminal.

The control channel is used to transmit a physical layer control signal (e.g., Downlink Control Information (DCI)) from a base station (that may be referred to as, for example, a Base Station (BS), a Transmission/Reception Point (TRP), an eNB B (eNB) or a gNB) to the user terminal (UE: User Equipment).

The DCI may be scheduling information including information related to at least one of, for example, resources (time and/or frequency resources) of data to be scheduled, a transport block (e.g., a Transport Block Size (TBS)), modulation and/or coding schemes, transmission acknowledgement information (also referred to as, for example, retransmission control information, HARQ-ACK or ACK/NACK), and a data DeModulation Reference Signal (DMRS).

The DCI for scheduling reception of DL data (e.g., downlink shared channel (PDSCH: Physical Downlink Shared Channel) and/or measurement of a DL reference signal may be referred to as a DL assignment, a DL grant or DL DCI. DCI for scheduling transmission of UL data (e.g., uplink shared channel (PUSCH: Physical Uplink Shared Channel) and/or transmission of a UL sounding (measurement) signal may be referred to as a UL grant or UL DCI.

The CORESET configuration may be notified by, for example, higher layer signaling (e.g., RRC signaling or an SIB).

The CORESET configuration may include CORESET related parameters (that may be referred to as CORESET parameters or PDCCH monitor parameters) such as a CORESET frequency resource (e.g., the number of RBs), a time resource (e.g., a start OFDM symbol number), a duration, a Resource Element Group (REG) bundle size (REG size), a transmission type (e.g., interleave or non-interleave) or a periodicity (e.g., a monitor periodicity per CORESET).

Furthermore, search space related parameters (that may be referred to as a search space configuration or search space parameters) may be configured to the UE. The search space parameters may be notified by, for example, higher layer signaling (e.g., RRC signaling). The search space parameters may be included in the CORESET configuration. Furthermore, the CORESET configuration may be referred to as the search space configuration.

The search space parameters may include a parameter for specifying a hash function used to derive the search space, a parameter used for the hash function, a parameter (e.g., UE IDentifier (UE-ID)) for Cyclic Redundancy Check (CRC) masking, and a Radio Network Temporary Identifier (an RNTI or a virtual UE-ID).

Furthermore, at least one of the CORESET configuration and the search space parameters may include the number of times of blind decoding per combination of an aggregation level and a DCI format. In this regard, at least one of the CORESET configuration and the search space parameters may be configured to include the numbers of times of blind decoding of combinations of part of aggregation levels and part of DCI formats instead of all combinations. Furthermore, "0" (i.e., blind decoding is not performed in a case of this combination of the aggregation level and the DCI format) can be configured to the number of times of blind decoding.

Thus, it has been studied for NR to perform control based on the CORESET, the DL BWP and the UL BWP. However, study regarding how to specifically configure these CORESET, DL BWP and UL BWP to the UE has not yet progressed. If an appropriate configuration method is not used, there is a risk that flexible control cannot be performed, and a communication throughput and frequency use efficiency deteriorate.

Hence, the inventors of the invention have studied a configuration method for performing control based on the BWP, and found the present invention.

The embodiments according to the present invention will be described in detail below with reference to the drawings. A radio communication method according to each embodiment may be applied alone or may be applied in combination.

In addition, in the following embodiments, a prefix "NR-" indicating use for NR may be assigned to and read as an optional signal and channel.

Furthermore, the following embodiments will describe an example of slot-based scheduling for scheduling data in slot units. However, the present invention may be applied to non-slot-based scheduling for scheduling data not in slot units.

In addition, a slot length may be, for example, 14 symbols, seven symbols or other numbers of symbols. Non-slot-based scheduling may be controlled in mini slot units (mini slot scheduling) or may be controlled in one or a plurality of symbol units. For example, a transmission duration of non-slot-based scheduling may be variable in the number of symbols that is one or more and less than the slot length.

(Radio Communication Method)

First Embodiment

In the first embodiment, one CORESET is associated with both of a DL BWP and a UL BWP. That is, a PDCCH of the CORESET schedules a PDSCH of the associated DL BWP and/or a PUSCH of the associated UL BWP. Furthermore, HARQ-ACK that responds to reception of the PDSCH is transmitted in the associated UL BWP.

In the first embodiment, the CORESET configuration includes CORESET parameters (and/or search space parameters) and, in addition, both of a DL BWP configuration (DP BWP parameters) and a UL BWP configuration (UL BWP parameters).

The DL BWP parameters may include information of, for example, DL BWP numerologies, numerologies of a downlink channel (and/or a downlink signal) instructed by DCI included in the CORESET, a DL BWP frequency position (e.g., center frequency), a DL BWP bandwidth (e.g., the number of PRBs) and a DL BWP index.

The UL BWP parameters may include information of, for example, UL BWP numerologies, numerologies of an uplink channel (and/or an uplink signal) instructed by the DCI included in the CORESET, a UL BWP frequency position (e.g., center frequency), a UL BWP bandwidth (e.g., the number of PRBs) and a UL BWP index.

In addition, the DL BWP parameters and the UL BWP parameters may be independently determined, and, for example, the DL BWP bandwidth and the UL BWP bandwidth may be different or the same. Furthermore, the DL BWP index and the UL BWP index may be each an individual (specific) index or a common index.

Both of the DL DCI and the UL DCI can be detected in the CORESET associated with both of the DL BWP and the UL BWP. The UE needs to decide whether the detected DCI is the DL DCI or the UL DCI (i.e., specify a DCI type) by using at least one of methods described below.

The UE may specify whether the detected DCI is the DL DCI or the UL DCI based on the search space configuration. For example, the DL DCI search space and the UL DCI search space may be configured not to overlap each other. The search spaces that do not overlap each other can be realized by, for example, differing values of the parameters for specifying the hash function used to derive the respective search spaces.

The UE may specify whether the detected DCI is the DL DCI or the UL DCI based on a certain field (a bit for a flag or a bit sequence) of the DCI.

The UE may specify whether the detected DCI is the DL DCI or the UL DCI based on the parameter (e.g., RNTI) used to mask CRC of the DCI. For example, the UE may assume a plurality of (e.g., two) RNTIs and monitor PDCCH candidates, or may specify a DCI type based on an RNTI for which CRC demasking has succeeded.

The UE may specify whether the detected DCI is the DL DCI or the UL DCI based on a DCI payload (e.g., payload size).

FIG. 1 is a diagram illustrating one example of a relationship between the CORESET and the DL/UL BWPs according to the first embodiment. A DL system bandwidth and a UL system bandwidth in FIG. 1 may be the same or different.

The UE monitors the CORESET and detects the DCI based on the CORESET parameters included in the CORESET configuration. When the detected DCI is the DL DCI, the UE receives a data channel and/or a reference signal in the DL BWP based on the DL BWP parameters included in the CORESET configuration.

When the detected DCI is the UL DCI, the UE transmits a data channel, a reference signal and/or a control channel in the UL BWP based on the UL BWP parameters included in the CORESET configuration.

Furthermore, when the detected DCI is the DL DCI, the UE receives the data channel in the DL BWP based on the DL BWP parameters included in the CORESET configuration, and transmits a transmission acknowledgement signal (HARQ-ACK) for this data channel as part of the control channel or the data channel based on the UL BWP parameters included in the CORESET configuration.

According to the above-described first embodiment, the UE can decide that the CORESET is associated with both of the DL BWP and the UL BWP, and suitably perform transmission and reception according to scheduling of the gNB.

Second Embodiment

In the second embodiment, one CORESET is associated with one of a DL BWP and a UL BWP. To configure both of the DL BWP and the UL BWP to the UE, two CORESET configurations are necessary.

That is, the DL DCI is mapped on the CORESET (that may be referred to as a CORESET for DL DCI or a DL-CORESET) associated with the DL BWP. The UL DCI is mapped on the CORESET (that may be referred to as a CORESET for UL DCI or a UL-CORESET) associated with the UL BWP. In addition, the UL-CORESET is mapped so as to be included in an active DL BWP.

In the second embodiment, the CORESET configuration includes CORESET parameters (and/or search space parameters) and, in addition, a DL BWP configuration (DL BWP parameters) or a UL BWP configuration (UL BWP parameters). The DL BWP parameters and the UL BWP parameters may each include information (information of numerologies) described above in relation to the first embodiment.

The UE may decide (specify) whether detected DCI is the DL DCI or the UL DCI by using at least one of methods described below.

The UE may specify whether the detected DCI is the DL DCI or the UL DCI based on the CORESET configuration. For example, the CORESET for the DL DCI and the CORESET for the UL DCI may be configured so as not to overlap each other.

Furthermore, the UE may specify whether the detected DCI is the DL DCI or the UL DCI by using at least one of the methods (e.g., a method based on a search space configuration) described above in relation to the first embodiment.

Figure 2:
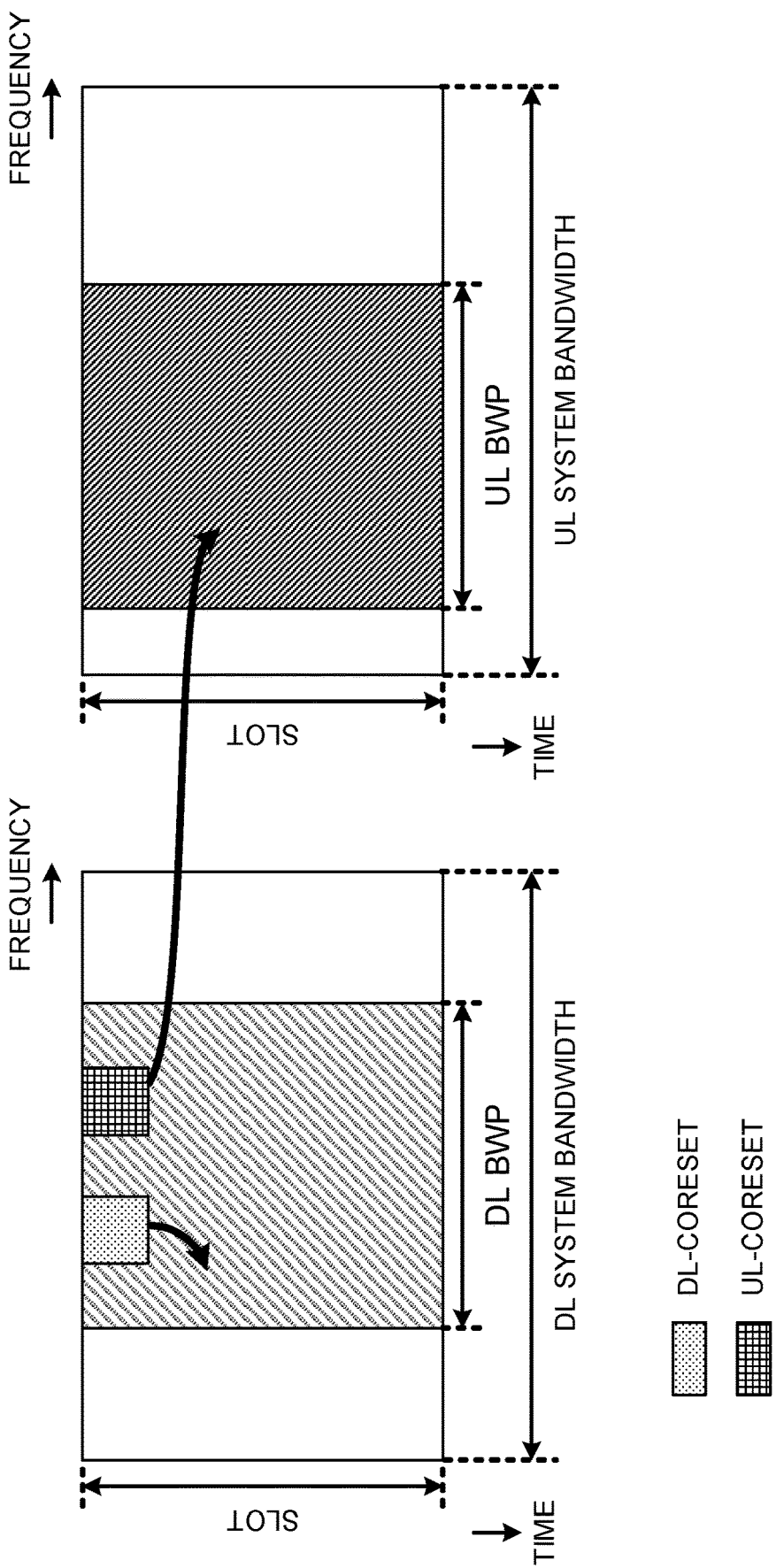
FIG. 2 is a diagram illustrating one example of a relationship between CORESETs and DL/UL BWPs according to a second embodiment.

FIG. 2 is a diagram illustrating one example of a relationship between CORESETs and DL/UL BWPs according to the second embodiment. A DL system bandwidth and a UL system bandwidth in FIG. 2 may be the same or different.

The UE monitors the DL-CORESET based on the CORESET parameters included in a first CORESET configuration, and detects DCI. When the DCI detected in the DL-CORESET is the DL DCI, the UE performs reception in the DL BWP based on the DL BWP parameters included in the first CORESET configuration.

Furthermore, the UE monitors the UL-CORESET based on the CORESET parameters included in a second CORESET configuration, and detects DCI. When the DCI detected in the UL-CORESET is the UL DCI, the UE performs transmission in the UL BWP based on the UL BWP parameters included in the second CORESET configuration.

Figure 3A:
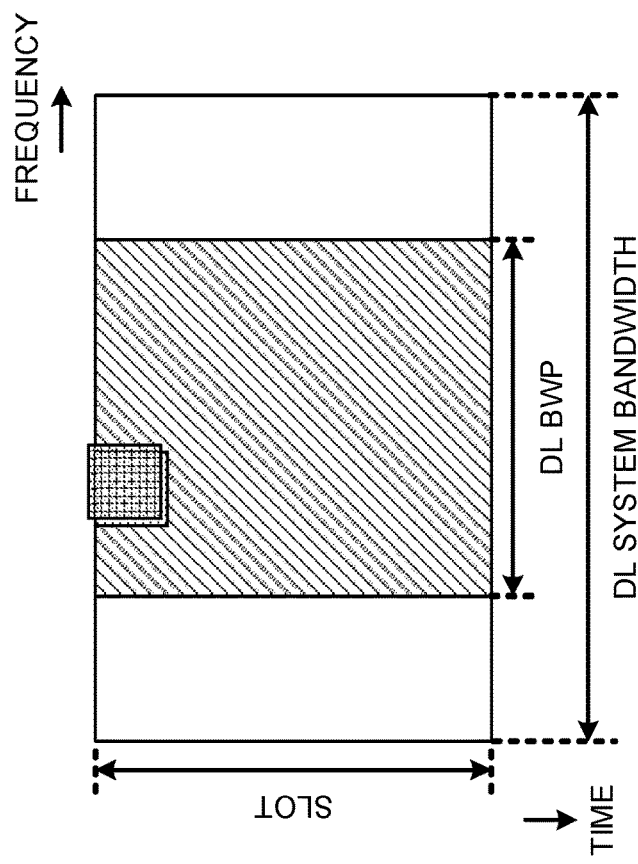
FIGS. 3A and 3B are diagrams illustrating one example of CORESET resources according to the second embodiment.
Figure 3B:
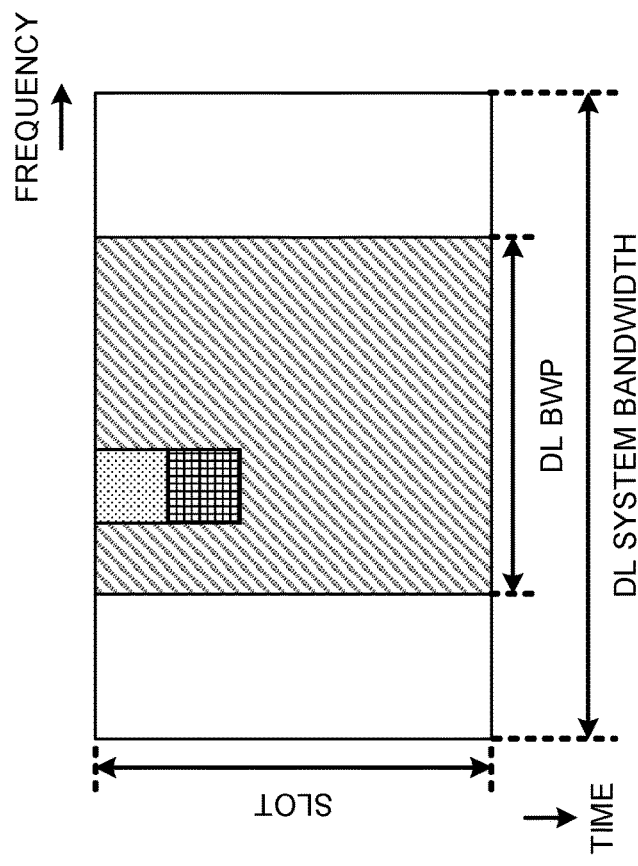

In addition, the DL-CORESET and the UL-CORESET are mapped on different frequency resources in FIG. 2, yet are not limited to this. FIGS. 3A and 3B are diagrams illustrating one example of CORESET resources according to the second embodiment.

FIGS. 3A and 3B each illustrate the example where the DL-CORESET and the UL-CORESET can be mapped on different time resources and on overlapping (same) time/frequency resources. In addition, "overlapping (same)" is an expression related to relative resources in a BWP, and may mean that DL DCI and UL DCI overlap in different slots.

In addition, a linkage of the DL BWP and the UL BWP may be explicitly or implicitly configured to the UE. When the linkage is configured, the UE may transmit a signal by using a UL BWP associated with a certain DL BWP in response to reception of a signal in the certain DL BWP. For example, the UE may transmit HARQ-ACK matching a PDSCH scheduled for a certain DL BWP by using the UL BWP linked to this certain DL BWP.

The CORESET configuration may include the linkage of the DL BWP and the UL BWP. For example, the CORESET configuration including the DL BWP parameter may include information for specifying the UL BWP associated with the DL BWP. For example, the CORESET configuration including the UL BWP parameters may include information for specifying the DL BWP associated with the UL BWP.

In this regard, information for specifying a BWP may include information of at least one of, for example, a BWP index, BWP numerologies, a BWP frequency position and a BWP bandwidth.

According to the above-described second embodiment, the UE can decide that the CORESET is associated with the DL BWP or the UL BWP, and suitably perform transmission and reception according to scheduling of a gNB.

Third Embodiment

The first and second embodiments have described the examples where a CORESET configuration includes DL BWP parameters. The third embodiment will describe an example where a DL BWP configuration includes CORESET parameters to the contrary.

In the third embodiment, the DL BWP configuration includes the DL BWP parameters and, in addition, the CORESET parameters (and/or search space parameters). The DL BWP parameters and the CORESET parameters may include the above-described information. In addition, a linkage of a DL BWP and a UL BWP described above in the second embodiment may be included in the DL BWP configuration.

When, for example, the DL BWP for a control channel is configured, the DL BWP configuration preferably includes the CORESET parameters as in the third embodiment. In addition, the same may apply to a case where the UL BWP configuration includes the CORESET parameters (and/or the search space parameters), too. The linkage of the DL BWP and the UL BWP described above in the second embodiment may be included in the UL BWP configuration.

According to the above-described third embodiment, the UE can decide that the DL BWP or the UL BWP is associated with the CORESET, and suitably perform transmission and reception according to scheduling of a gNB.

In addition, it is also possible to combine the first or second embodiment and the third embodiment. For example, a first DL BWP configuration may include the CORESET parameters, and the CORESET parameters may include a second DL BWP configuration. In this case, a CORESET resource can be determined based on the first DL BWP configuration, and a resource of a data channel scheduled by the DL DCI transmitted by the CORESET can be determined based on the second DL BWP configuration.

In addition, when the first DL BWP configuration includes the CORESET parameters and the CORESET parameters do not include part or entirety of the second DL BWP configuration, the UE may assume that the second DL BWP configuration is the same as part or entirety of the first DL BWP configuration.

Alternatively, the first DL BWP configuration may include both of the CORESET parameters and the second DL BWP parameters. Similarly in this case, too, the CORESET resource can be determined based on the first DL BWP configuration, and the resource of the data channel scheduled by the DL DCI transmitted by the CORESET can be determined based on the second DL BWP configuration.

In addition, when the first DL BWP configuration includes the CORESET parameters and does not include part or entirety of the second DL BWP configuration, the UE may assume that the second DL BWP configuration is the same as part or entirety of the first DL BWP configuration.

Modified Example

In addition, in each embodiment, different UL BWPs may be configured to be used by an uplink signal (and/or an uplink channel). For example, a case where a UL BWP 1 is configured as a UL BWP for a PUCCH to a UE, and a UL BWP 2 is configured as a UL BWP for a PUSCH to the UE will be described.

In this case, the UE transmits UCI on the PUCCH associated with the UL BWP 1 at a timing at which the PUSCH is not transmitted, and transmits the UCI on the PUSCH associated with the UL BWP 2 at a timing at which the PUSCH is transmitted. Furthermore, when a plurality of PUSCHs are transmitted on one or a plurality of carriers, the UE may transmit the UCI on the PUSCH associated with at least one UL BWP.

In addition, a method that is described in each embodiment and specifies whether detected DCI is DL DCI or UL DCI may be read as a method for distinguishing between DL DCIs and/or UL DCIs.

Furthermore, in each embodiment, a CORESET frequency resource may be determined (associated) based on at least one (e.g., numerology) of certain DL BWP parameters. At least one of the certain DL BWP parameters may be configured by, for example, using higher layer signaling.

(Radio Communication System)

The configuration of the radio communication system according to one embodiment of the present invention will be described below. This radio communication system uses one or a combination of the radio communication method according to each of the above embodiments of the present invention to perform communication.

Figure 4:
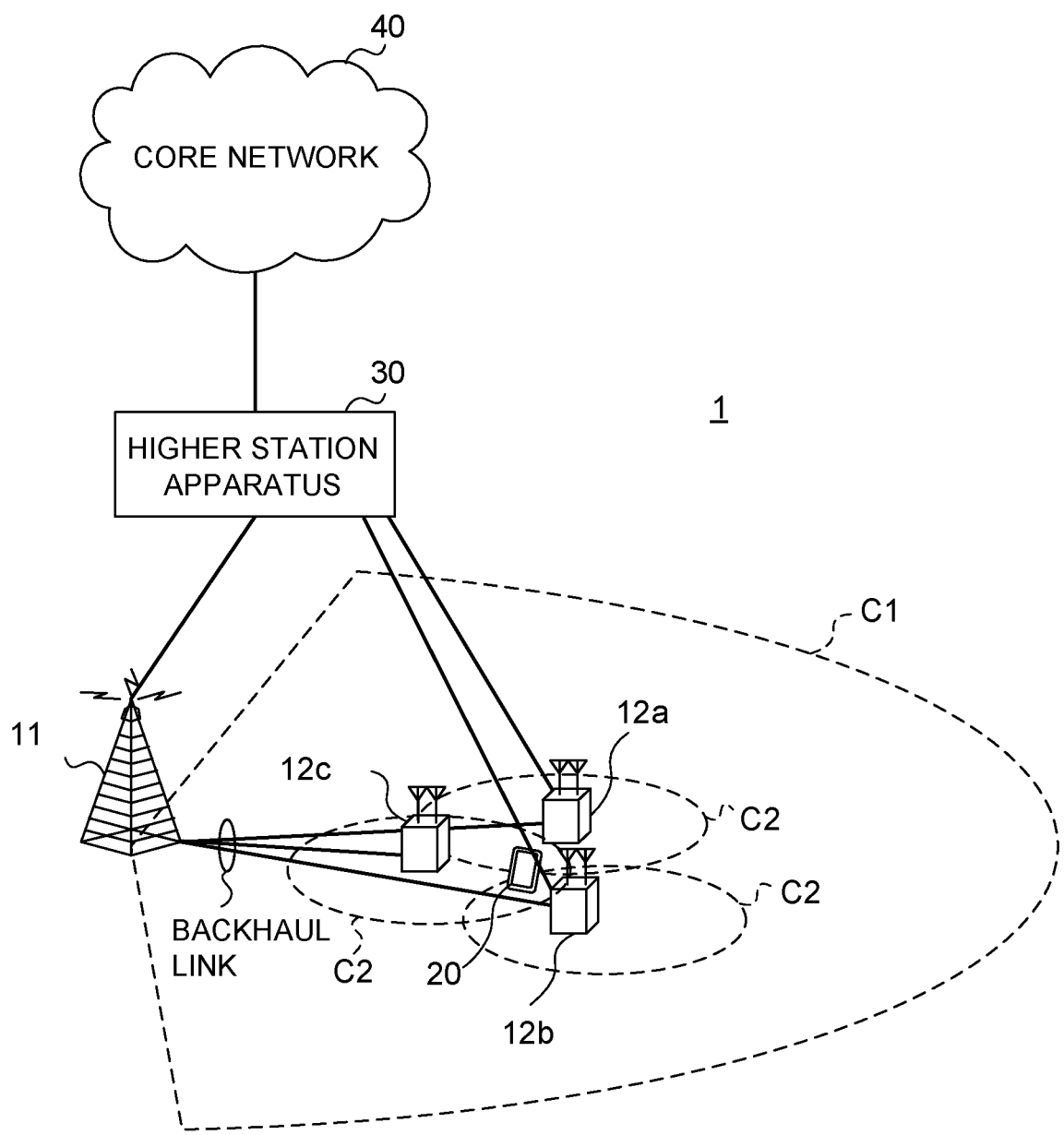
FIG. 4 is a diagram illustrating one example of a schematic configuration of a radio communication system according to one embodiment of the present invention.

FIG. 4 is a diagram illustrating one example of a schematic configuration of the radio communication system according to the one embodiment of the present invention. A radio communication system 1 can apply Carrier Aggregation (CA) and/or Dual Connectivity (DC) that aggregate a plurality of base frequency blocks (component carriers) whose one unit is a system bandwidth (e.g., 20 MHz).

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), New Radio (NR), Future Radio Access (FRA) and the New Radio Access Technology (New-RAT), or a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2. An arrangement and the numbers of respective cells and user terminals 20 are not limited to those illustrated in FIG. 4.

The user terminal 20 can connect with both of the radio base station 11 and the radio base stations 12. The user terminal 20 is assumed to concurrently use the macro cell C1 and the small cells C2 by CA or DC. Furthermore, the user terminal 20 can apply CA or DC by using a plurality of cells (CCs) (e.g., five CCs or less or six CCs or more).

The user terminal 20 and the radio base station 11 can communicate by using a carrier (also referred to as a legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz or 5 GHz) or may use the same carrier as that used between the user terminal 20 and the radio base station 11. In this regard, a configuration of the frequency band used by each radio base station is not limited to this.

Furthermore, the user terminal 20 can perform communication by using Time Division Duplex (TDD) and/or Frequency Division Duplex (FDD) in each cell. Furthermore, each cell (carrier) may be applied a single numerology or may be applied a plurality of different numerologies.

The numerology may refer to a communication parameter that is applied to transmission and/or reception of a certain signal and/or a channel, and indicate at least one of, for example, a subcarrier spacing, a bandwidth, a symbol length, a cyclic prefix length, a subframe length, a TTI length, the number of symbols per TTI, a radio frame configuration, filtering processing and windowing processing.

The radio base station 11 and each radio base station 12 (or the two radio base stations 12) may be connected by way of wired connection (e.g., optical fibers compliant with a Common Public Radio Interface (CPRI) or an X2 interface) or by way of radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and Single Carrier Frequency Division Multiple Access (SC-FDMA) and/or or OFDMA to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into a band including one or contiguous resource blocks per terminal and causes a plurality of terminals to use respectively different bands to reduce an inter-terminal interference. In this regard, uplink and downlink radio access schemes are not limited to a combination of these, and other radio access schemes may be used for the uplink and downlink radio access schemes.

The radio communication system 1 uses a downlink shared channel (PDSCH: Physical Downlink Shared Channel) shared by each user terminal 20, a broadcast channel (PBCH: Physical Broadcast Channel) and a downlink L1/L2 control channel as downlink channels. User data, higher layer control information and System Information Blocks (SIBS) are transmitted on the PDSCH. Furthermore, Master Information Blocks (MIBs) are transmitted on the PBCH.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of the PDSCH and/or the PUSCH is transmitted on the PDCCH.

In addition, scheduling information may be notified by DCI. For example, the DCI for scheduling DL data reception may be referred to as a DL assignment or the DCI for scheduling UL data transmission may be referred to as a UL grant.

The number of OFDM symbols used for the PDCCH is transmitted on the PCFICH. Transmission acknowledgement information (also referred to as, for example, retransmission control information, HARQ-ACK or ACK/NACK) of a Hybrid Automatic Repeat reQuest (HARQ) for the PUSCH is transmitted on the PHICH. The EPDCCH is subjected to frequency division multiplexing with the PDSCH (downlink shared data channel) and is used to transmit DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are transmitted on the PUSCH. Furthermore, downlink radio quality information (CQI: Channel Quality Indicator), transmission acknowledgement information and a Scheduling Request (SR) are transmitted on the PUCCH. A random access preamble for establishing connection with a cell is transmitted on the PRACH.

The radio communication system 1 transmits a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 transmits a Sounding Reference Signal (SRS) and a DeModulation Reference Signal (DMRS) as uplink reference signals. In this regard, the DMRS may be referred to as a user terminal specific reference signal (UE-specific Reference Signal). Furthermore, a reference signal to be transmitted is not limited to these.

(Radio Base Station)

Figure 5:
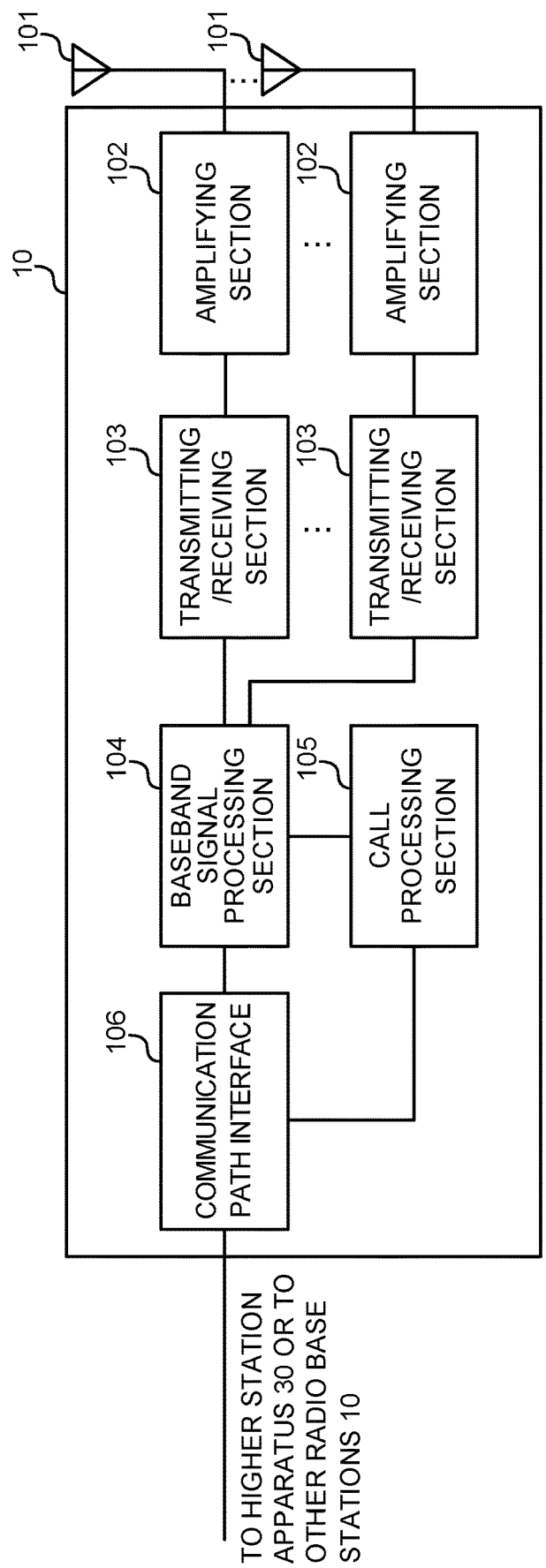
FIG. 5 is a diagram illustrating one example of an overall configuration of a radio base station according to the one embodiment of the present invention.

FIG. 5 is a diagram illustrating one example of an overall configuration of the radio base station according to the one embodiment of the present invention. The radio base station 10 includes pluralities of transmission/reception antennas 101, amplifying sections 102 and transmission/reception sections 103, a baseband signal processing section 104, a call processing section 105 and a channel interface 106. In this regard, the radio base station 10 only needs to be configured to include one or more of each of the transmission/reception antennas 101, the amplifying sections 102 and the transmission/reception sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of an RLC layer such as Radio Link Control (RLC) retransmission control, Medium Access Control (MAC) retransmission control (e.g., HARQ transmission processing), and transmission processing such as scheduling, transmission format selection, channel coding, Inverse Fast Fourier Transform (IFFT) processing, and precoding processing on the user data, and transfers the user data to each transmission/reception section 103. Furthermore, the baseband signal processing section 104 performs transmission processing such as channel coding and inverse fast Fourier transform on a downlink control signal, too, and transfers the downlink control signal to each transmission/reception section 103.

Each transmission/reception section 103 converts a baseband signal precoded and output per antenna from the baseband signal processing section 104 into a radio frequency band, and transmits a radio frequency signal. The radio frequency signal subjected to frequency conversion by each transmission/reception section 103 is amplified by each amplifying section 102, and is transmitted from each transmission/reception antenna 101. The transmission/reception sections 103 can be composed of transmitters/receivers, transmission/reception circuits or transmission/reception apparatuses described based on a common knowledge in a technical field according to the present invention. In this regard, the transmission/reception sections 103 may be composed as an integrated transmission/reception section or may be composed of transmission sections and reception sections.

Meanwhile, each amplifying section 102 amplifies a radio frequency signal received by each transmission/reception antenna 101 as an uplink signal. Each transmission/reception section 103 receives the uplink signal amplified by each amplifying section 102. Each transmission/reception section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of an RLC layer and a PDCP layer on user data included in the input uplink signal, and transfers the user data to the higher station apparatus 30 via the channel interface 106. The call processing section 105 performs call processing (such as a configuration and release) of a communication channel, state management of the radio base station 10, and radio resource management.

The channel interface 106 transmits and receives signals to and from the higher station apparatus 30 via a certain interface. Furthermore, the channel interface 106 may transmit and receive (backhaul signaling) signals to and from the another radio base station 10 via an inter-base station interface (e.g., optical fibers compliant with the Common Public Radio Interface (CPRI) or the X2 interface).

Each transmission/reception section 103 may transmit a signal/channel by using a certain BWP to the user terminal 20. Furthermore, the user terminal 20 may receive a signal/channel transmitted by using a certain BWP.

Furthermore, each transmission/reception section 103 may transmit information of, for example, a CORESET configuration, a search space configuration and a BWP configuration to the user terminal 20.

Figure 6:
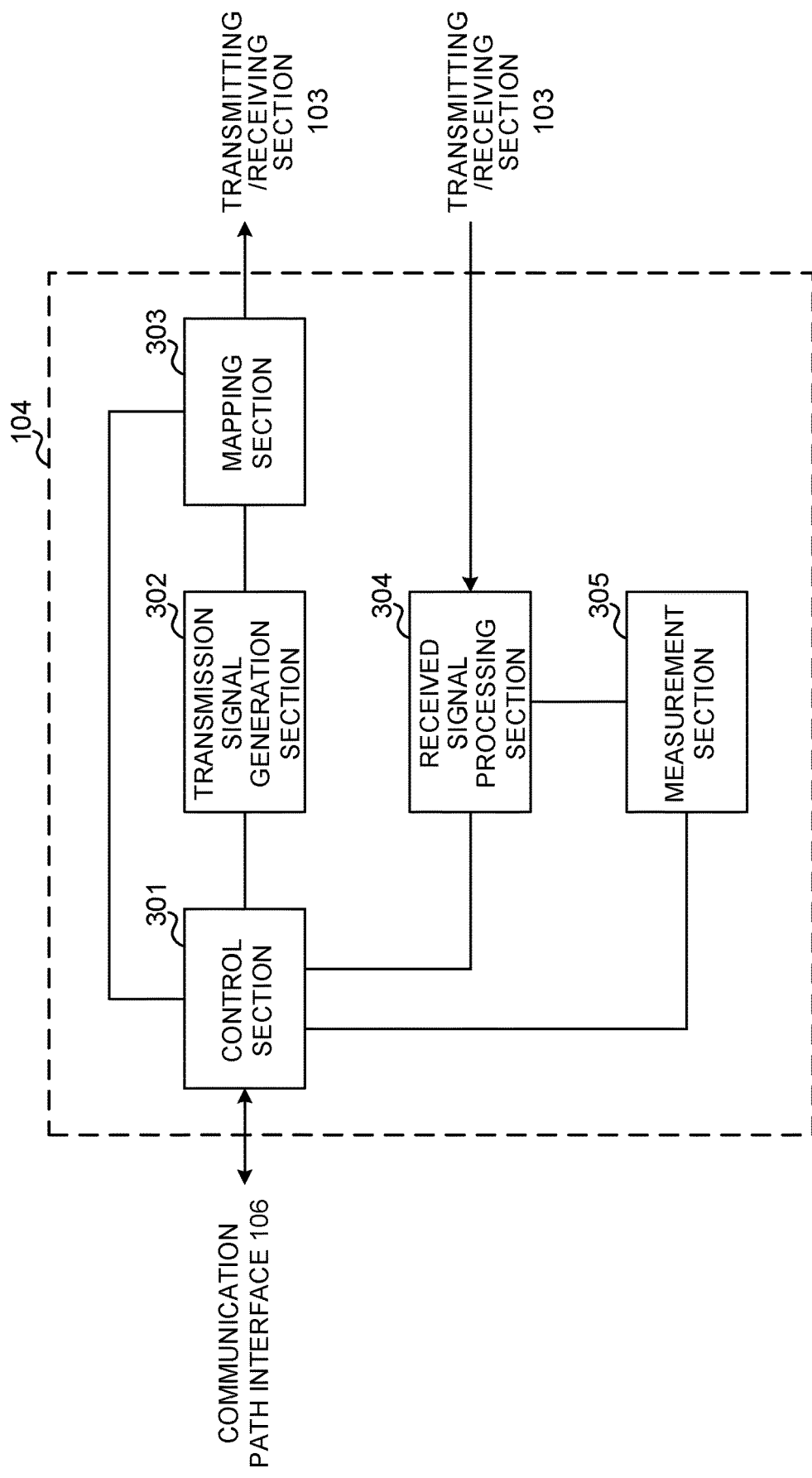
FIG. 6 is a diagram illustrating one example of a function configuration of the radio base station according to the one embodiment of the present invention.

FIG. 6 is a diagram illustrating one example of a function configuration of the radio base station according to the one embodiment of the present invention. In addition, this example mainly illustrates function blocks of characteristic portions according to the present embodiment, and may assume that the radio base station 10 includes other function blocks, too, that are necessary for radio communication.

The baseband signal processing section 104 includes at least a control section (scheduler) 301, a transmission signal generating section 302, a mapping section 303, a received signal processing section 304 and a measurement section 305. In addition, these components only need to be included in the radio base station 10, and part or all of the components may not be included in the baseband signal processing section 104.

The control section (scheduler) 301 controls the entire radio base station 10. The control section 301 can be composed of a controller, a control circuit or a control apparatus described based on the common knowledge in the technical field according to the present invention.

The control section 301 controls, for example, signal generation of the transmission signal generating section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal transmitted on the PDSCH), and a downlink control signal (e.g., a signal that is transmitted on the PDCCH and/or the EPDCCH and is, for example, transmission acknowledgement information). Furthermore, the control section 301 controls generation of a downlink control signal and a downlink data signal based on a result obtained by deciding whether or not it is necessary to perform retransmission control on an uplink data signal. Furthermore, the control section 301 controls scheduling of synchronization signals (e.g., a Primary Synchronization Signal (PSS)/a Secondary Synchronization Signal (SSS)) and downlink reference signals (e.g., a CRS, a CSI-RS and a DMRS).

Furthermore, the control section 301 controls scheduling of an uplink data signal (e.g., a signal transmitted on the PUSCH), an uplink control signal (e.g., a signal that is transmitted on the PUCCH and/or the PUSCH and is, for example, transmission acknowledgement information), a random access preamble (e.g., a signal transmitted on the PRACH) and an uplink reference signal.

The control section 301 performs control for transmitting information for causing the user terminal 20 to decide a relationship between a certain COntrol REsource SET (CORESET) and a certain BandWidth Part (BWP) to the user terminal 20.

The information may be a BWP configuration included in the CORESET configuration, the CORESET configuration included in the BWP configuration or information indicating a relationship between BWP configurations.

The transmission signal generating section 302 generates a downlink signal (such as a downlink control signal, a downlink data signal or a downlink reference signal) based on an instruction from the control section 301, and outputs the downlink signal to the mapping section 303. The transmission signal generating section 302 can be composed of a signal generator, a signal generating circuit or a signal generating apparatus described based on the common knowledge in the technical field according to the present invention.

The transmission signal generating section 302 generates, for example, a DL assignment for notifying downlink signal allocation information, and/or a UL grant for notifying uplink signal allocation information based on the instruction from the control section 301. The DL assignment and the UL grant are both DCI, and conform to a DCI format. Furthermore, the transmission signal generating section 302 performs encoding processing and modulation processing on a downlink data signal according to a code rate and a modulation scheme determined based on Channel State Information (CSI) from each user terminal 20.

The mapping section 303 maps the downlink signal generated by the transmission signal generating section 302, on a certain radio resource based on the instruction from the control section 301, and outputs the downlink signal to each transmission/reception section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a received signal input from each transmission/reception section 103. In this regard, the received signal is, for example, an uplink signal (such as an uplink control signal, an uplink data signal or an uplink reference signal) transmitted from the user terminal 20. The received signal processing section 304 can be composed of a signal processor, a signal processing circuit or a signal processing apparatus described based on the common knowledge in the technical field according to the present invention.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and/or the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present invention.

For example, the measurement section 305 may perform Radio Resource Management (RRM) measurement or Channel State Information (CSI) measurement based on the received signal. The measurement section 305 may measure received power (e.g., Reference Signal Received Power (RSRP)), received quality (e.g., Reference Signal Received Quality (RSRQ), a Signal to Interference plus Noise Ratio (SINR) or a Signal to Noise Ratio (SNR)), a signal strength (e.g., a Received Signal Strength Indicator (RSSI)) or channel information (e.g., CSI). The measurement section 305 may output a measurement result to the control section 301.

(User Terminal)

Figure 7:
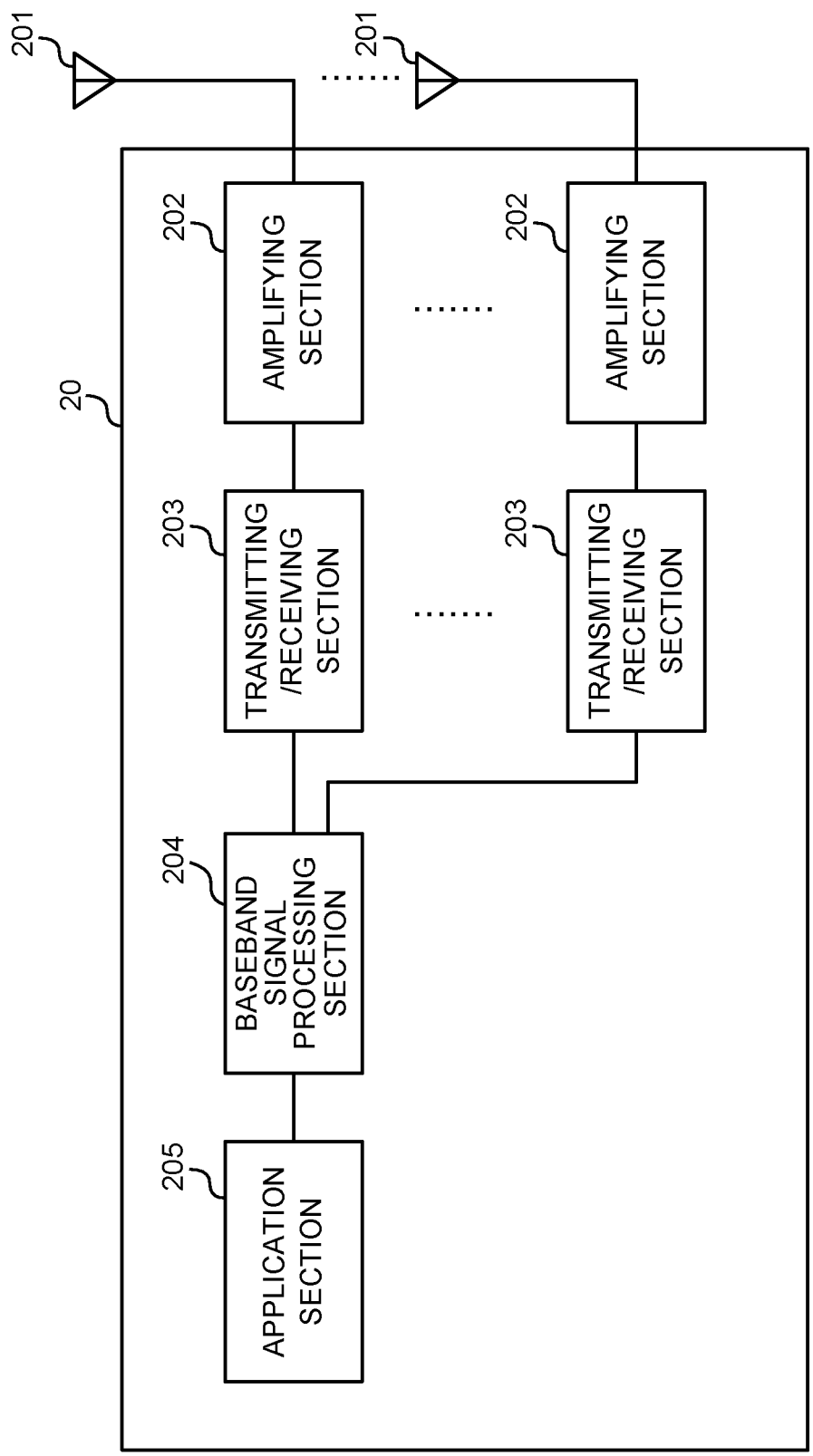
FIG. 7 is a diagram illustrating one example of an overall configuration of a user terminal according to the one embodiment of the present invention.

FIG. 7 is a diagram illustrating one example of an overall configuration of the user terminal according to the one embodiment of the present invention. The user terminal 20 includes pluralities of transmission/reception antennas 201, amplifying sections 202 and transmission/reception sections 203, a baseband signal processing section 204 and an application section 205. In this regard, the user terminal 20 only needs to be configured to include one or more of each of the transmission/reception antennas 201, the amplifying sections 202 and the transmission/reception sections 203.

Each amplifying section 202 amplifies a radio frequency signal received at each transmission/reception antenna 201. Each transmission/reception section 203 receives a downlink signal amplified by each amplifying section 202. Each transmission/reception section 203 performs frequency conversion on the received signal into a baseband signal, and outputs the baseband signal to the baseband signal processing section 204. The transmission/reception sections 203 can be composed of transmitters/receivers, transmission/reception circuits or transmission/reception apparatuses described based on the common knowledge in the technical field according to the present invention. In this regard, the transmission/reception sections 203 may be composed as an integrated transmission/reception section or may be composed of transmission sections and reception sections.

The baseband signal processing section 204 performs FFT processing, error correcting decoding, and reception processing of retransmission control on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information, too, among the downlink data to the application section 205.

On the other hand, the application section 205 inputs uplink user data to the baseband signal processing section 204. The baseband signal processing section 204 performs transmission processing of retransmission control (e.g., HARQ transmission processing), channel coding, precoding, Discrete Fourier Transform (DFT) processing and IFFT processing on the uplink user data, and transfers the uplink user data to each transmission/reception section 203. Each transmission/reception section 203 converts the baseband signal output from the baseband signal processing section 204 into a radio frequency band, and transmits a radio frequency signal. The radio frequency signal subjected to the frequency conversion by each transmission/reception section 203 is amplified by each amplifying section 202, and is transmitted from each transmission/reception antenna 201.

Each transmission/reception section 203 may transmit a signal/channel by using a certain BWP to the radio base station 10. Furthermore, the radio base station 10 may receive a signal/channel transmitted by using a certain BWP.

Furthermore, each transmission/reception section 203 may receive information of, for example, a CORESET configuration, a search space configuration and a BWP configuration from the radio base station 10.

Figure 8:
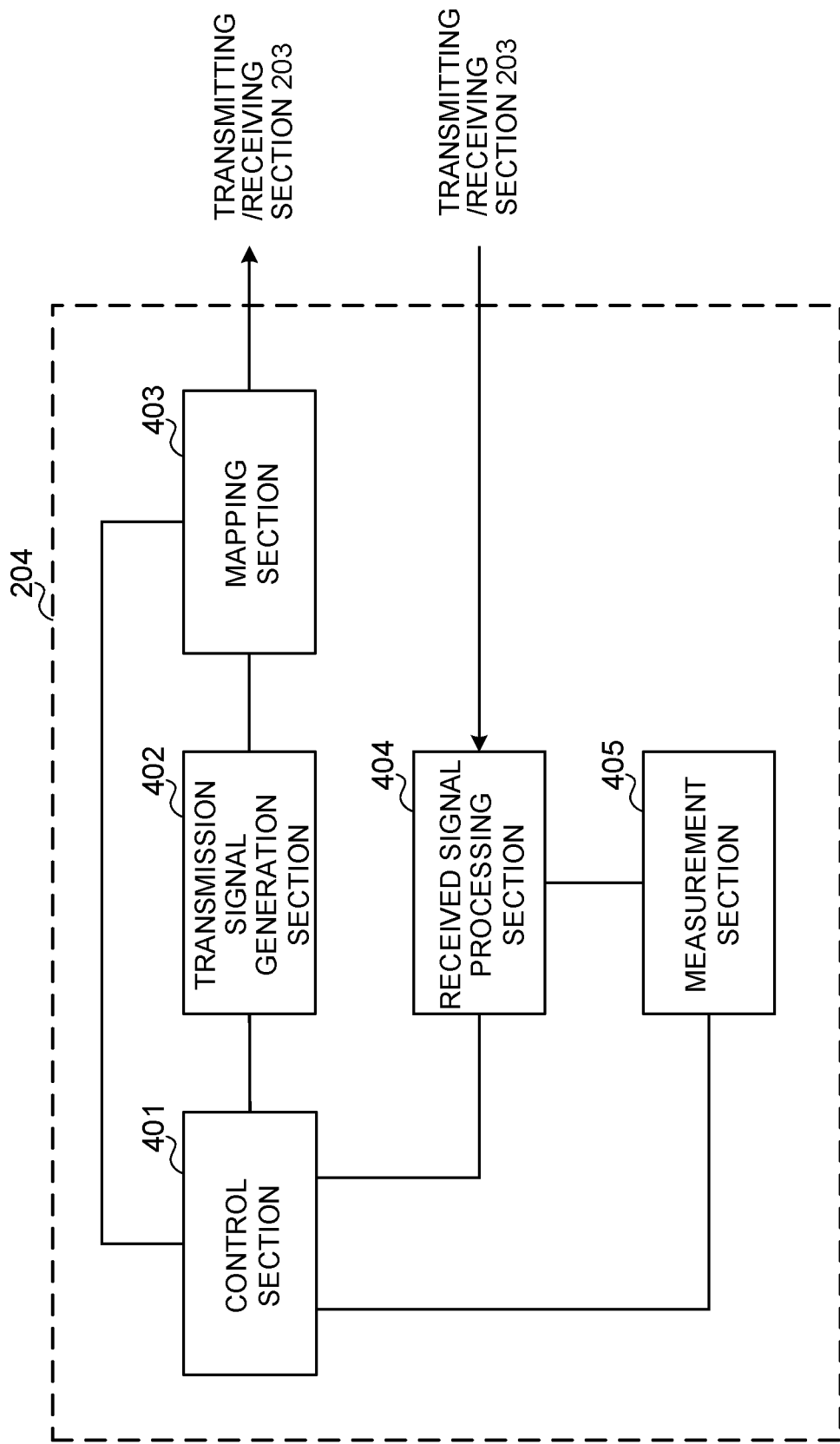
FIG. 8 is a diagram illustrating one example of a function configuration of the user terminal according to the one embodiment of the present invention.

FIG. 8 is a diagram illustrating one example of a function configuration of the user terminal according to the one embodiment of the present invention. In addition, this example mainly illustrates function blocks of characteristic portions according to the present embodiment, and may assume that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components may not be included in the baseband signal processing section 204.

The control section 401 controls the entire user terminal 20. The control section 401 can be composed of a controller, a control circuit or a control apparatus described based on the common knowledge in the technical field according to the present invention.

The control section 401 controls, for example, signal generation of the transmission signal generating section 402 and signal allocation of the mapping section 403. Furthermore, the control section 401 controls signal reception processing of the received signal processing section 404 and signal measurement of the measurement section 405.

The control section 401 obtains from the received signal processing section 404 a downlink control signal and a downlink data signal transmitted from the radio base station 10. The control section 401 controls generation of an uplink control signal and/or an uplink data signal based on a result obtained by deciding whether or not it is necessary to perform retransmission control on the downlink control signal and/or the downlink data signal.

The control section 401 may decide a relationship between a certain COntrol REsource SET (CORESET) and a certain BandWidth Part (BWP). Furthermore, when detecting physical layer signaling (e.g., DCI) in the above certain CORESET, the control section 401 may perform control for performing transmission and/or reception in the above certain BWP based on the above relationship.

The control section 401 may decide that the above certain CORESET is associated with both of a DL BWP and a UL BWP, or decide that the above certain CORESET is associated with one of the DL BWP and the UL BWP. This decision may be made based on a BWP configuration included in a CORESET configuration or the CORESET configuration included in the BWP configuration.

When detecting DCI in the CORESET associated with both of the DL BWP and the UL BWP, the control section 401 may perform control for performing reception in the above DL BWP in a case where the DCI instructs DL reception (DL DCI).

When detecting the DCI in the CORESET associated with both of the DL BWP and the UL BWP, the control section 401 may perform control for performing transmission in the above UL BWP in a case where the DCI instructs UL transmission (UL DCI).

The control section 401 may decide a relationship between a certain BWP (e.g., DL BWP) associated with the CORESET, and another BWP (e.g., UL BWP). The control section 401 may perform control for performing transmission in the UL BWP associated with the DL BWP in response to DL reception in the DL BWP.

Furthermore, when obtaining from the received signal processing section 404 various pieces of information notified from the radio base station 10, the control section 401 may update parameters used for control based on the information.

The transmission signal generating section 402 generates an uplink signal (such as an uplink control signal, an uplink data signal or an uplink reference signal) based on an instruction from the control section 401, and outputs the uplink signal to the mapping section 403. The transmission signal generating section 402 can be composed of a signal generator, a signal generating circuit or a signal generating apparatus described based on the common knowledge in the technical field according to the present invention.

The transmission signal generating section 402 generates an uplink control signal related to transmission acknowledgement information and Channel State Information (CSI) based on, for example, the instruction from the control section 401. Furthermore, the transmission signal generating section 402 generates an uplink data signal based on the instruction from the control section 401. When, for example, the downlink control signal notified from the radio base station 10 includes a UL grant, the transmission signal generating section 402 is instructed by the control section 401 to generate an uplink data signal.

The mapping section 403 maps the uplink signal generated by the transmission signal generating section 402, on a radio resource based on the instruction from the control section 401, and outputs the uplink signal to each transmission/reception section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the received signal input from each transmission/reception section 203. In this regard, the received signal is, for example, a downlink signal (such as a downlink control signal, a downlink data signal or a downlink reference signal) transmitted from the radio base station 10. The received signal processing section 404 can be composed of a signal processor, a signal processing circuit or a signal processing apparatus described based on the common knowledge in the technical field according to the present invention. Furthermore, the received signal processing section 404 can compose the reception section according to the present invention.

The received signal processing section 404 outputs information decoded by the reception processing to the control section 401. The received signal processing section 404 outputs, for example, broadcast information, system information, RRC signaling and DCI to the control section 401. Furthermore, the received signal processing section 404 outputs the received signal and/or the signal after the reception processing to the measurement section 405.

The measurement section 405 performs measurement related to the received signal. The measurement section 405 can be composed of a measurement instrument, a measurement circuit or a measurement apparatus described based on the common knowledge in the technical field according to the present invention.

For example, the measurement section 405 may perform RRM measurement or CSI measurement based on the received signal. The measurement section 405 may measure received power (e.g., RSRP), received quality (e.g., RSRQ, an SINR or an SNR), a signal strength (e.g., RSSI) or channel information (e.g., CSI). The measurement section 405 may output a measurement result to the control section 401.

(Hardware Configuration)

In addition, the block diagrams used to describe the above embodiments illustrate blocks in function units. These function blocks (components) are realized by an optional combination of hardware and/or software. Furthermore, a method for realizing each function block is not limited in particular. That is, each function block may be realized by using one physically and/or logically coupled apparatus or may be realized by using a plurality of these apparatuses formed by connecting two or more physically and/or logically separate apparatuses directly and/or indirectly (by using, for example, wired connection and/or radio connection).

Figure 9:
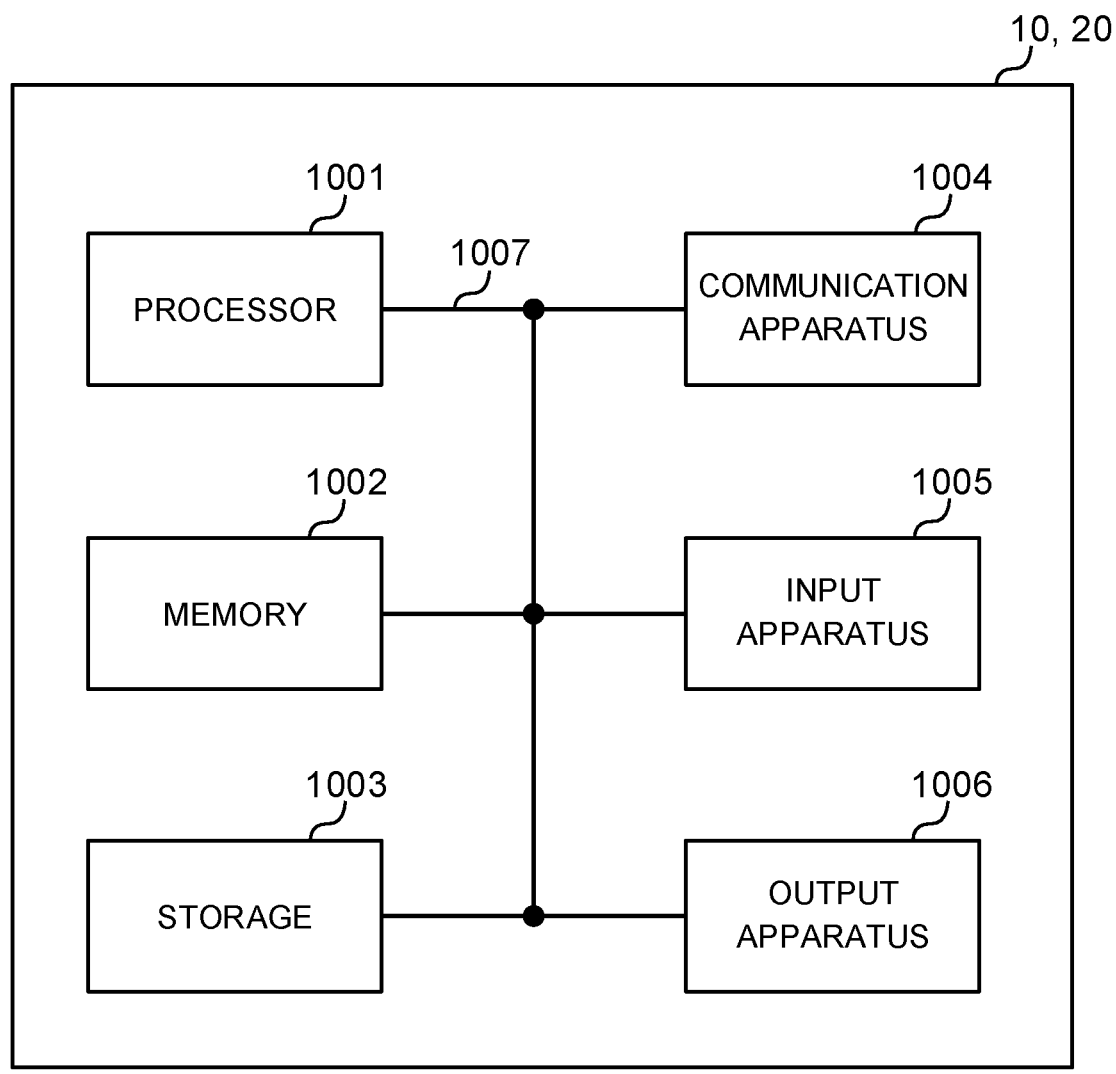
FIG. 9 is a diagram illustrating one example of hardware configurations of the radio base station and the user terminal according to the one embodiment of the present invention.

For example, the radio base station and the user terminal according to the one embodiment of the present invention may function as computers that perform processing of the radio communication method according to the present invention. FIG. 9 is a diagram illustrating one example of the hardware configurations of the radio base station and the user terminal according to the one embodiment of the present invention. The above radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 9 or may be configured without including part of the apparatuses.

For example, FIG. 9 illustrates the only one processor 1001. However, there may be a plurality of processors. Furthermore, processing may be executed by one processor or may be executed by one or more processors concurrently, successively or by using another method. In addition, the processor 1001 may be implemented by one or more chips.

Each function of the radio base station 10 and the user terminal 20 is realized by, for example, causing hardware such as the processor 1001 and the memory 1002 to read certain software (program), and thereby causing the processor 1001 to perform an operation, and control communication performed via the communication apparatus 1004 and control reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above embodiments are used. For example, the control section 401 of the user terminal 20 may be realized by a control program stored in the memory 1002 and operating on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to carry out the radio communication method according to the one embodiment of the present invention.

The storage 1003 is a computer-readable recording medium and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via a wired and/or radio network, and is also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above transmission/reception antennas 101 (201), amplifying sections 102 (202), transmission/reception sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using buses that are different between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by using at least one of these types of hardware.

Modified Example

In addition, each term that has been described in this description and/or each term that is necessary to understand this description may be replaced with terms having identical or similar meanings. For example, a channel and/or a symbol may be signals (signaling). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of periods (frames) in a time domain. Each of one or a plurality of periods (frames) that composes a radio frame may be referred to as a subframe. Furthermore, the subframe may include one or a plurality of slots in the time domain. The subframe may be a fixed duration (e.g., one ms) that does not depend on the numerologies.

Furthermore, the slot may include one or a plurality of symbols (Orthogonal Frequency Division Multiplexing (OFDM) symbols or Single Carrier Frequency Division Multiple Access (SC-FDMA) symbols) in the time domain. Furthermore, the slot may be a time unit based on the numerologies. Furthermore, the slot may include a plurality of mini slots. Each mini slot may include one or a plurality of symbols in the time domain. Furthermore, the mini slot may be referred to as a subslot.

The radio frame, the subframe, the slot, the mini slot and the symbol each indicate a time unit for transmitting signals. The other corresponding names may be used for the radio frame, the subframe, the slot, the mini slot and the symbol. For example, one subframe may be referred to as a Transmission Time Interval (TTI), a plurality of contiguous subframes may be referred to as TTIs, or one slot or one mini slot may be referred to as a TTI. That is, the subframe and/or the TTI may be a subframe (one ms) according to legacy LTE, may be a period (e.g., 1 to 13 symbols) shorter than one ms or may be a period longer than one ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used by each user terminal) in TTI units to each user terminal. In this regard, a definition of the TTI is not limited to this.

The TTI may be a transmission time unit of a channel-coded data packet (transport block), a code block and/or a codeword, or may be a processing unit of scheduling or link adaptation. In addition, when the TTI is given, a time interval (e.g., the number of symbols) in which a transport block, a code block and/or a codeword are actually mapped may be shorter than the TTI.

In addition, when one slot or one mini slot is referred to as a TTI, one or more TTIs (i.e., one or more slots or one or more mini slots) may be a minimum time unit of scheduling. Furthermore, the number of slots (the number of mini slots) that compose a minimum time unit of the scheduling may be controlled.

The TTI having the duration of one ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a duration exceeding one ms, and the short TTI (e.g., the reduced TTI) may be read as a TTI having a TTI length less than the TTI length of the long TTI and equal to or more than one ms.

Resource Blocks (RBs) are resource allocation units of the time domain and the frequency domain, and may include one or a plurality of contiguous subcarriers in the frequency domain. Furthermore, the RB may include one or a plurality of symbols in the time domain or may have the length of one slot, one mini slot, one subframe or one TTI. One TTI or one subframe may be each composed of one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may be composed of one or a plurality of Resource Elements (REs). For example, one RE may be a radio resource domain of one subcarrier and one symbol.

In this regard, structures of the above radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by using absolute values, may be expressed by using relative values with respect to certain values or may be expressed by using other corresponding information. For example, a radio resource may be instructed by a certain index.

Names used for parameters in this description are by no means restrictive ones. For example, various channels (the Physical Uplink Control Channel (PUCCH) and the Physical Downlink Control Channel (PDCCH)) and information elements can be identified based on various suitable names. Therefore, various names assigned to these various channels and information elements are by no means restrictive ones.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by using a management table. The input and output information and signals can be overwritten, updated or additionally written. The output information and signals may be deleted. The input information and signals may be transmitted to other apparatuses.

Notification of information is not limited to the aspects/embodiments described in this description and may be performed by other methods. For example, the information may be notified by physical layer signaling (e.g., Downlink Control Information (DCI) and Uplink Control Information (UCI)), higher layer signaling (e.g., Radio Resource Control (RRC) signaling, broadcast information (Master Information Blocks (MIBs) and System Information Blocks (SIBS)), and Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of certain information (e.g., notification of "being X") may be made not only explicitly but also implicitly (by, for example, not notifying this certain information or by notifying another information).

Decision may be made based on a value (0 or 1) expressed by one bit, may be made based on a boolean expressed by true or false or may be made by comparing numerical values (e.g., comparison with a certain value).

Irrespectively of whether software is referred to as software, firmware, middleware, a microcode or a hardware description language or as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSL)) and/or radio techniques (e.g., infrared rays and microwaves), these wired techniques and/or radio technique are included in a definition of the transmission media.

The terms "system" and "network" used in this description are compatibly used.

In this description, the terms "Base Station (BS)", "radio base station", "eNB", "gNB", "cell", "sector", "cell group", "carrier" and "component carrier" can be compatibly used. The base station is also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used. The base station is also referred to as a term such as a fixed station, a NodeB, an eNodeB (eNB), an access point, a transmission point, a reception point, a femtocell or a small cell in some cases.

The mobile station is also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above radio base station 10. Furthermore, words such as "uplink" and "downlink" may be read as "sides". For example, the uplink channel may be read as a side channel.

Similarly, the user terminal in this description may be read as the radio base station. In this case, the radio base station 10 may be configured to include the functions of the above user terminal 20.

In this description, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MME) or Serving-Gateways (S-GW) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" "calculating", "computing", "processing", "deriving", "investigating", "looking up" (e.g., looking up in a table, a database or another data structure) and "ascertaining". Furthermore, "deciding (determining)" may be regarded to "decide (determine)" "receiving" (e.g., receiving information), "transmitting" (e.g., transmitting information), "input", "output" and "accessing" (e.g., accessing data in a memory). Furthermore, "deciding (determining)" may be regarded to "decide (determine)" "resolving", "selecting", "choosing", "establishing" and "comparing". That is, "deciding (determining)" may be regarded to "decide (determine)" some operation.

The words "connected" and "coupled" used in this description or every modification of these words can mean every direct or indirect connection or coupling between two or more elements, and can include that one or more intermediate elements exist between the two elements "connected" or "coupled" with each other. The elements may be coupled or connected physically, logically or by way of a combination of physical and logical connections. For example, "connection" may be read as "access".

It can be understood that, when the two elements are connected in this description, the two elements are "connected" or "coupled" with each other by using one or more electric wires, cables and/or printed electrical connection, and by using electromagnetic energy having wavelengths in radio frequency domains, microwave domains and/or (both of visible and invisible) light domains in some non-restrictive and incomprehensive examples.

A sentence that "A and B are different" in this description may mean that "A and B are different from each other". Words such as "separate" and "coupled" may be interpreted in a similar manner.

When the words "including" and "comprising" and modifications of these words are used in this description or the claims, these words intend to be comprehensive similar to the word "having". Furthermore, the word "or" used in this description or the claims intends not to be an exclusive OR.

The present invention has been described in detail above. However, it is obvious for a person skilled in the art that the present invention is not limited to the embodiments described in this description. The present invention can be carried out as modified and changed aspects without departing from the gist and the scope of the present invention defined based on the recitation of the claims. Accordingly, the disclosure of this description intends for exemplary explanation, and does not have any restrictive meaning to the present invention.

The invention claimed is:

1. A terminal comprising:
   a receiver that receives configuration information for a downlink bandwidth part (DL BWP), the configuration information including a control resource set (CORESET) configuration and a related search space configuration; and
   a processor that determines a CORESET related to a DL BWP based on the configuration information for the DL BWP,
   wherein, upon detection of a downlink control information in the CORESET, the receiver receives a physical downlink shared channel (PDSCH) in the DL BWP, based on the configuration information for the DL BWP, and
   wherein the search space configuration includes information on a number of times of blind decoding of a combination of part of aggregation levels and part of downlink control information (DCI) formats.

2. The terminal according to claim 1, wherein the information on the number of times of blind decoding of the combination comprises '0'.

3. A radio communication method for a terminal comprising:
   receiving configuration information for a downlink bandwidth part (DL BWP), the configuration information including a control resource set (CORESET) configuration and a related search space configuration; and
   determining a CORESET related to a DL BWP based on the configuration information for the DL BWP,
   wherein, upon detection of a downlink control information in the CORESET, the terminal receives a physical downlink shared channel (PDSCH) in the DL BWP, based on the configuration information for the DL BWP, and
   wherein the search space configuration includes information on a number of times of blind decoding of a combination of part of aggregation levels and part of downlink control information (DCI) formats.

4. A system comprising:
   a terminal that comprises:
     a receiver that receives configuration information for a downlink bandwidth part (DL BWP), the configuration information including a control resource set (CORESET) configuration and a related search space configuration; and
     a processor that determines a CORESET related to a DL BWP based on the configuration information for the DL BWP,
     wherein, upon detection of a downlink control information in the CORESET, the receiver receives a physical downlink shared channel (PDSCH) in the DL BWP, based on the configuration information for the DL BWP, and
     wherein the search space configuration includes information on a number of times of blind decoding of a combination of part of aggregation levels and part of downlink control information (DCI) formats; and
   a base station that comprises:
     a transmitter that transmits the configuration information to the terminal.

* * * * *